(12) United States Patent
Joch et al.

(10) Patent No.: US 7,912,127 B2
(45) Date of Patent: Mar. 22, 2011

(54) H.264 TO VC-1 AND VC-1 TO H.264 TRANSCODING

(75) Inventors: Anthony Peter Joch, Waterloo (CA); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1629 days.

(21) Appl. No.: 11/198,435

(22) Filed: Aug. 5, 2005

(65) Prior Publication Data

US 2007/0030901 A1   Feb. 8, 2007

(51) Int. Cl.
*H04B 1/66*   (2006.01)

(52) U.S. Cl. ......... 375/240.16; 375/240.25; 375/240.26; 375/240.12; 375/240.24; 375/240.13; 375/240.2; 382/233; 382/235; 382/236; 382/238; 382/250; 382/246

(58) Field of Classification Search ............. 375/240.16, 375/240.25, 240.26, 240.12, 240.24, 240.13, 375/240.2; 382/233, 235, 236, 238, 250, 382/246

See application file for complete search history.

(56) References Cited

U.S. PATENT DOCUMENTS

| | | | |
|---|---|---|---|
| 5,442,401 A | 8/1995 | Murakami et al. | 348/405 |
| 6,625,320 B1 * | 9/2003 | Nilsson et al. | 382/238 |
| 7,480,335 B2 * | 1/2009 | Payson | 375/240.25 |
| 7,602,846 B1 * | 10/2009 | Wu et al. | 375/240.12 |
| 2005/0232497 A1 * | 10/2005 | Yogeshwar et al. | 382/232 |
| 2006/0153294 A1 | 7/2006 | Wang et al. | 375/240.08 |

* cited by examiner

*Primary Examiner* — Shawn An
(74) *Attorney, Agent, or Firm* — Christopher P. Maiorana, PC

(57) ABSTRACT

A method for transcoding from an H.264 format to a VC-1 format. The method generally comprises the steps of (A) decoding an input video stream in the H.264 format to generate a picture having a plurality of macroblock pairs that used an H.264 macroblock adaptive field/frame coding; (B) determining a mode indicator for each of the macroblock pairs; and (C) coding the macroblock pairs into an output video stream in the VC-1 format using one of (i) a VC-1 field motion compensation mode coding and (ii) a VC-1 frame motion compensation mode coding as determined from the mode indicator.

4 Claims, 6 Drawing Sheets

H.264 TO VC-1 AND VC-1 TO H.264 TRANSCODING

The present invention is related to copending U.S. patent application Ser. No. 11/198,456 filed Aug. 5, 2005, Ser. No. 11/198,694 filed Aug. 5, 2005, Ser. No. 11/198,455 filed Aug. 5, 2005, Ser. No. 11/198,448 filed Aug. 5, 2005 and Ser. No. 11/198,457 filed Aug. 5, 2005, all hereby incorporated by reference in their entirety.

FIELD OF THE INVENTION

The present invention relates to transcoding generally and, more particularly, to H.264 to VC-1 and VC-1 to H.264 video transcoding.

BACKGROUND OF THE INVENTION

A significant amount of video content is currently available in the MPEG-2 format. Furthermore, a large number of both cable set top boxes and satellite set top boxes that only support the MPEG-2 format are currently deployed. Therefore, compatibility with the MPEG-2 standard will remain important for years to come.

An H.264/MPEG4-AVC digital video standard (H.264 for short) is an emerging new format for consumer video, particularly in both new broadcast and High-Definition (HD) Digital Versatile Disk (DVD) applications. A Society of Motion Picture and Television Engineers (SMPTE) VC-1 digital video standard is an emerging new format for consumer video, particularly in both new video over Internet Protocol (IP) and high definition DVD applications. As H.264 based content and products become available, transcoding in both directions (i) between the H.264 standard and the MPEG-2 standard, (ii) between the VC-1 standard and the MPEG-2 standard and (iii) between the H.264 standard and the VC-1 standard will become widely used capabilities. Anticipated consumer applications include reception of MPEG-2 broadcasts by a personal video recorder (PVR) and transcoding to either H.264 or VC-1 for saving on disk storage space. In another example, reception of H.264 or VC-1 satellite, H.264 or VC-1 cable broadcasts and VC-1 network broadcasts by a DVD recorder, transcoding the H.264/VC-1 material into MPEG-2 and then recording to a compatible DVD-R, DVD+R, DVD-RW and/or DVD+RW format magnetic disk or optical disk. The H.264 material is also expected to be transcoded into the VC-1 format for storage and display on a personal computer. Professional applications are also widely anticipated. Such applications include H.264 to MPEG-2 transcoding and VC-1 to MPEG-2 transcoding for content received at a headend facility in the H.264/VC-1 format that is transcoded into the MPEG-2 format or the VC-1 format for the "last mile" for compliance with currently deployed receivers. In another example, MPEG-2 to H.264/VC-1 transcoding could be used to save bandwidth for expensive transmission media such as satellite links. In still another example, MPEG-2 to H.264/VC-1 transcoding could be used for video server/video on demand (VOD) applications where the content could be stored in H.264/VC-1 for disk space savings and then transcoded to MPEG-2, H.264 or VC-1 format supported by a requesting client. Furthermore, the consumer market is a large market with strict complexity/cost constraints that will benefit substantially from an efficient and effective transcoding technology.

SUMMARY OF THE INVENTION

The present invention concerns a method for transcoding from an H.264 format to a VC-1 format. The method generally comprises the steps of (A) decoding an input video stream in the H.264 format to generate a picture having a plurality of macroblock pairs that used an H.264 macroblock adaptive field/frame coding; (B) determining a mode indicator for each of the macroblock pairs; and (C) coding the macroblock pairs into an output video stream in the VC-1 format using one of (i) a VC-1 field motion compensation mode coding and (ii) a VC-1 frame motion compensation mode coding as determined from the mode indicator.

The objects, features and advantages of the present invention include providing a method and/or apparatus for video transcoding that may provide (i) low-complexity, high-quality H.264 to MPEG-2 transcoding, (ii) low-complexity, high-quality MPEG-2 to H.264 transcoding, (iii) low-complexity, high-quality VC-1 to MPEG-2 transcoding, (iv) low-complexity, high-quality MPEG-2 to VC-1 transcoding, (v) low-complexity, high-quality H.264 to VC-1 transcoding, (vi) low-complexity, high-quality VC-1 to H.264 transcoding and/or (vii) a hardware architecture that may allow for efficient transcoding within a single chip (or die).

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
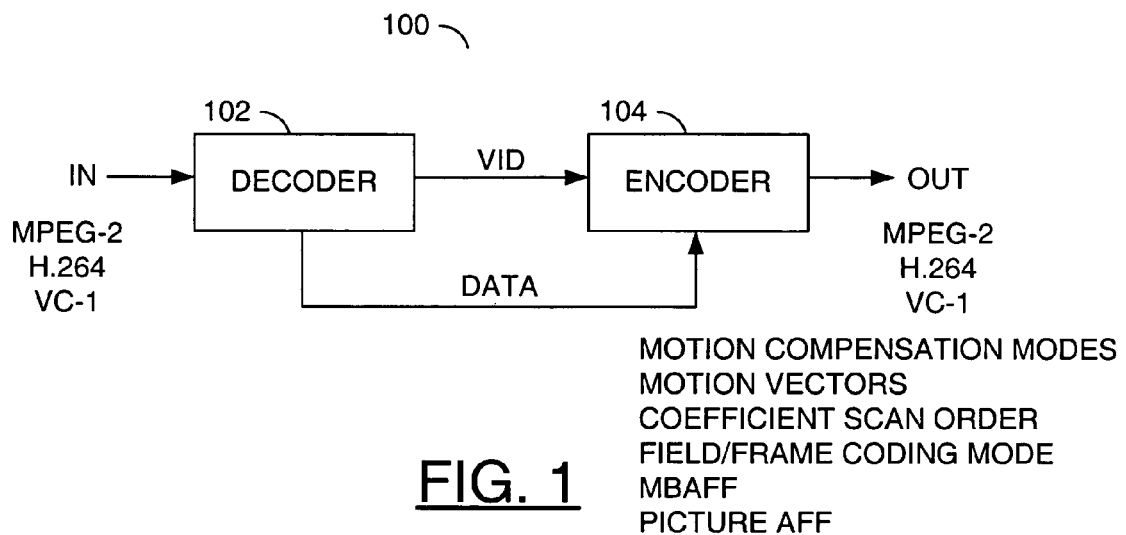
FIG. 1 is a functional block diagram of a first system in accordance with a preferred embodiment of the present invention.

Referring to FIG. 1, a functional block diagram of a first system 100 is shown in accordance with a preferred embodiment of the present invention. The first system (or circuit) 100 may be referred to as a video transcoder. The video transcoder 100 generally comprises a decoder module (or function) 102 and an encoder module (or function) 104. A signal (e.g., IN) may be received by the decoder module 102. The decoder module 102 may generate a signal (e.g., VID) and generate one or more signals, generally represented by a signal (e.g., DATA). The encoder module 104 may receive the signals VID and DATA. A signal (e.g., OUT) may be presented by the encoder module 102.

The signal IN may be a compressed digital video bitstream compliant with a starting video standard (or format). The starting video standard may be one of an MPEG-2 standard, an H.264 standard and a VC-1 standard. The signal VID may be a non-compressed digital video signal in an interlaced format or a progressive format. The signal OUT may be a compressed digital video bitstream compliant with an ending video standard (or format). The ending video standard may be one of the MPEG-2 standard, the H.264 standard and the VC-1 standard. In general, the starting format of the compressed information in the signal IN is different from the ending format of the compressed information in the signal OUT.

The signal DATA generally comprises one or more types of information and/or indicators extracted from the signal IN during a decoding operation. The information/indicators in the signal DATA may be useful in coding the signal VID during an encoding operation. The signal DATA may convey one or more of the following (i) motion compensation modes, (ii) motion vectors, (iii) coefficient scan order, (iv) file/frame coding mode, (v) macroblock adaptive field/frame information (MBAFF), (vi) picture adaptive field/frame information and/or similar information obtained while decoding the signal IN.

Implementation of the video transcoder 100 may comprise a single chip (or die) in (on) which both the decoder module 102 and the encoder module 104 may be formed. In another embodiment, the video transcoder 100 may comprise two chips (or die). A first chip of the video transcoder 100 may comprise the decoder module 102. A second chip of the video transcoder 100 may comprise the encoder module 104.

Figure 2:
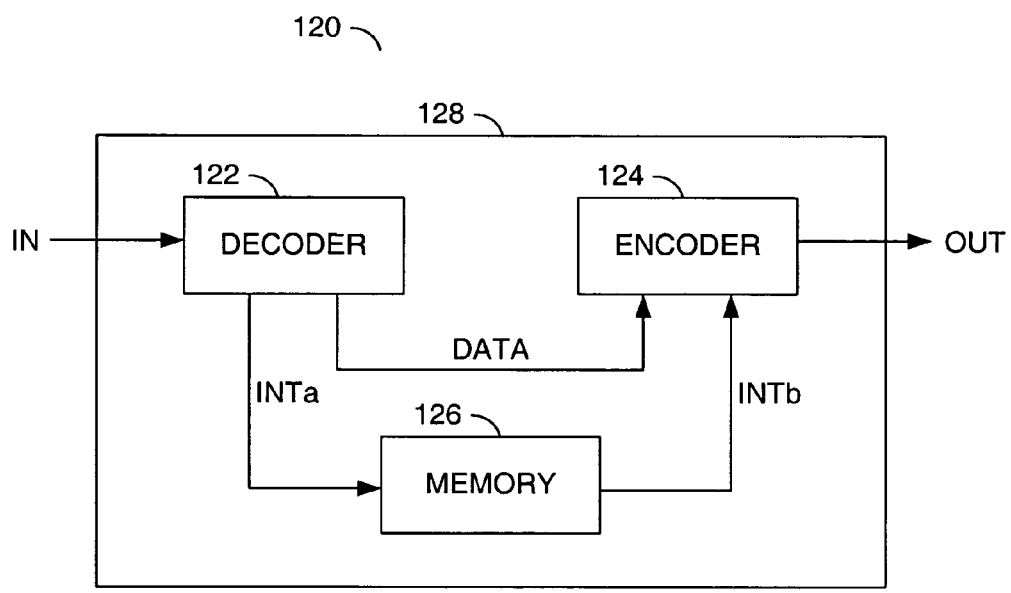
FIG. 2 is a functional block diagram of a second system.

Referring to FIG. 2, a functional block diagram of a second system 120 is shown. The second system (or circuit) 120 may be referred to as a second video transcoder. The second video transcoder 120 generally comprises a decoder module (or function) 122, an encoder module (or function) 124 and a memory module (or function) 126. The decoder module 122 may receive the signal IN and generate the signal DATA. An intermediate signal (e.g., INTa) may be presented by the decoder module 122 to the memory module 126. The encoder module 124 may receive the signal DATA and present the signal OUT. A second intermediate signal (e.g., INTb) may be received by the encoder module 124 from the memory module 126.

The intermediate signals INTa and INTb may be used to transfer pixel information from the decoder module 122 to the encoder module 124. The pixel information may be buffered in the memory module 126 until utilized by the encoder module 124.

In some embodiments, the video transcoder 120 may be implemented as a single chip (or die) 128. The chip 128 may comprise the decoder module 122, the encoder module 124 and the memory module 126. The memory module 126 and the intermediate signals INTa and INTb may provide a capability to transfer partially decoded pictures from the decoder module 122 to the encoder module 124 before the decoder module 122 has completed decoding of the entire picture. As such, the encoder module 124 may operate substantially in parallel with the decoder module 122 by operating on the same picture substantially simultaneously. The memory module 126 may also be capable of temporarily buffering one or more fully decoded pictures. Therefore, the decoder module 122 may operate at least one picture ahead of the encoder module 124 with the memory module 126 storing all indicators for all macroblocks of the buffered pictures.

The first video transcoder 100 and/or the second video transcoder 120 (generically referred to as a video transcoder) may be operational to convert the signal IN from an original video standard (or format) to a transcoded video standard (or format). Transcoding may include, but is not limited to, (i) the MPEG-2 format to the H.264 format conversion, (ii) the H.264 format to the MPEG-2 format conversion, (iii) the MPEG-2 format to the VC-1 format conversion, (iv) the VC-1 format to the MPEG-2 format conversion, (v) the H.264 format to the VC-1 format and (vi) the VC-1 format to the H.264 format.

Transcoding from MPEG-2 to H.264

Transcoding from the MPEG-2 standard to the H.264 standard generally raises several problems. For example, the use of a raster scan order of 16×16 macroblocks in the MPEG-2 does not directly convert into the raster scan of 32×16 macroblock pairs in H.264. Furthermore, the use of a regular group of pictures (GOP) in MPEG-2 is not directly translatable into a hierarchical GOP structure in H.264. The MPEG-2 standard consistently uses either field coding or frame coding within an independently decodable sequence of pictures (e.g., MPEG-2 GOP). The MPEG-2 standard also allows for field/frame picture coding, adaptively selected at picture boundaries. The H.264 standard may switch on a picture basis between field coding, frame coding and MBAFF coding. The MPEG-2 standard provides separate signaling of motion compensation field/frame mode and coefficient field/frame scan order whereas the H.264 standard does not. Still furthermore, field/frame macroblock decisions may be made independently for each macroblock in MPEG-2 while H.264 uses a field/frame macroblock decision for a macroblock pair.

Several capabilities may be implemented in the video transcoders of the present invention to resolve one or more of the above problems. Consider a vertical pair of macroblocks coded per the MPEG-2 standard. Generally, four indicators may exist in the two original MPEG-2 macroblocks of the pair that indicate a correct H.264 field/frame mode to use for a transcoded MB pair. In particular, the four indicators may comprise (i) a motion compensation mode (e.g., field or frame) for the top macroblock of the pair, (ii) a coefficient scan order (e.g., field or frame) for the top macroblock, (iii) a motion compensation mode (e.g., field or frame) for the bottom macroblock of the pair and (iv) a coefficient scan order for the bottom macroblock.

If either of the original two macroblocks use a field motion compensation mode, the transcoded macroblock pair may use the field motion compensation mode. Optionally, if either or both of the original two macroblocks use both a field coefficient scan and have a significant residual (e.g., generally contains non-zero coefficients), the transcoded macroblock pair may use the field motion compensation mode.

For transcoding MPEG-2 pictures to H.264 MBAFF pictures, the macroblock scan order for the MPEG-2 decoding, which is typically raster order, may be done in MBAFF scan order. Decoding in the MBAFF scan order may be possible because (i) an MPEG-2 stream should have a startcode at a start of each macroblock row and (ii) spatial prediction may only depend on each leftmost macroblock.

Figure 3:
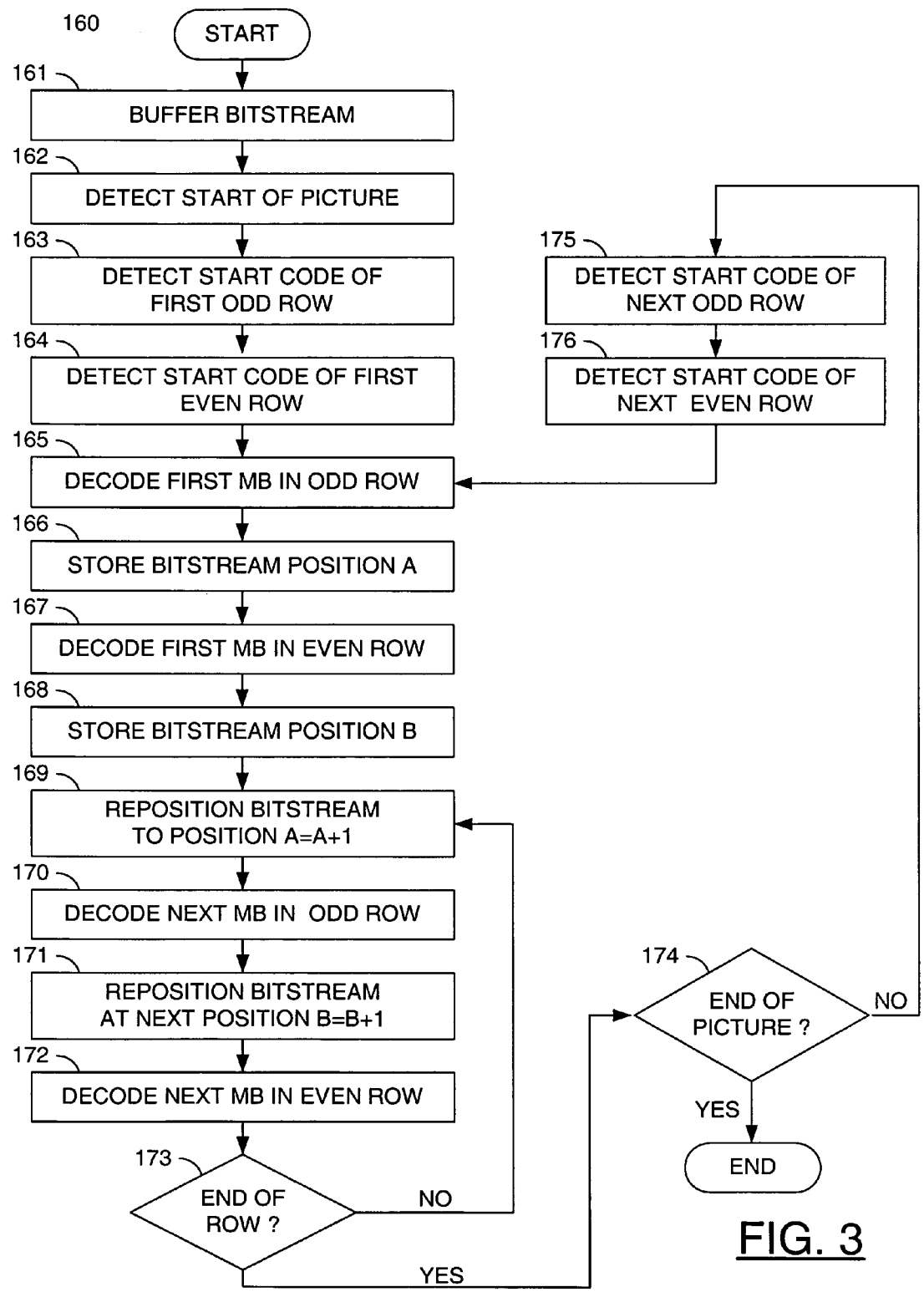
FIG. 3 is a flow diagram of an example method for an MPEG-2 macroblock adaptive field/frame decode order.

Referring to FIG. 3, a flow diagram of an example method 160 for an MPEG-2 MBAFF decode order is shown. The method (or process) 160 generally comprises a step (or block) 161, a step (or block) 162, a step (or block) 163, a step (or block) 164, a step (or block) 165, a step (or block) 166, a step (or block) 167, a step (or block) 168, a step (or block) 169, a step (or block) 170, a step (or block) 171, a step (or block) 172, a step (or block) 173, a step (or block) 174, a step (or block) 175 and a step (or block) 176.

A portion (e.g., greater than one row of macroblocks) of the signal IN may be buffered in the step 161. The method 160 may detect a start of a picture in the step 162 (e.g., a startcode for an initial macroblock row) and detect a start code for a first odd row of macroblocks (e.g., row 1) in the step 163. A start code for a first even row of macroblocks (e.g., row 2) may be detected in the step 164.

A first macroblock in the current odd row may be decoded in the step 165. The position of the just-decoded first odd row macroblock may be stored as a first position (e.g., a position A) in the step 166. A first macroblock in the current event row may be decoded in the step 167. The position of the just-decoded first even row macroblock may be stored as a first position (e.g., a position B) in the step 168. The first macroblock in the odd row and the first macroblock in the even row may form a macroblock pair. The macroblock in the odd row may be referred to as a top macroblock of the pair. The macroblock in the even row may be referred to as a bottom macroblock of the pair.

To decode a next macroblock pair, the method 160 may reposition the buffered portion of the signal IN to a macroblock in the odd row (e.g., a position A=A+1) adjoining the first macroblock at the original position A in the step 169. The second macroblock in the odd row may be decoded in the step 170. The method 160 may reposition to a macroblock in the even row (e.g., a position B=B+1) adjoining the first macroblock at the original position B in the step 171. A second macroblock in the even row may then be decoded in the step 172. If the decoded macroblock does not end the row (e.g., the NO branch of step 173), the bitstream (e.g., signal IN) may be repositioned to a next macroblock in the odd row (step 169), the macroblock decoded (step 170), the bitstream repositioned to the next even row macroblock (step 171) and the macroblock decoded (step 172) until the end of a row is reached (e.g., the YES branch of step 173).

Once an end (e.g., rightmost macroblocks) of the current two rows have been decoded, the method 160 may check for an end of the picture in step 174. If the picture is not fully decoded (e.g., the NO branch of step 174), a start code for a next odd row (e.g., row 3) may be detected in the step 175. The start code for a next even row (e.g., row 4) may be detected in the step 176. The method 160 may continue with decoding a first macroblock in the new odd row in the step 165. The position A of the just-decoded macroblock may be stored in the step 166. A first macroblock in the new even row may be decoded in the step 167 and the position B updated in the step 168. Decoding of the macroblock pairs, may continue until the end of the row (e.g., the YES branch of step 173). Decoding of the macroblock pairs may continue with subsequent rows until the end of the picture is reached (e.g., the YES branch of step 174).

Another approach that may be implemented in transcoding from MPEG-2 to H.264 may be a reuse of one or both of (i) an MPEG-2 quantization parameter (QP) and (ii) a number of bits used per macroblock decoding. The MPEG-2 QP and/or number of bits used per macroblock may provide the encoding process a macroblock complexity indication. The macroblock complexity indication may be utilized by the H.264 coding process for adjusting an encoder rate control.

Another indicator that may be passed from the decoder module to the encoder module may be the MPEG-2 motion vectors from each decoded picture. The MPEG-2 motion vectors may be used by the encoder module to place a search center of an H.264 motion estimation. The H.264 motion estimation may refine the MPEG-2 vectors to obtain a refined motion vector for H.264 encoding for modes that may not be supported by the MPEG-2 standard. The unsupported elements may include, but are not limited to, different block sizes, smaller sub-pel accuracy (e.g., from ½ pel to ¼ pel), use of multiple reference pictures, and search with a weighted prediction.

The decoder module may present MPEG-2 intra-frame concealment motion vectors to the encoder module as a starting point for a motion vector refinement. The MPEG-2 intra-frame concealment motion vectors may be passed along if an I-frame from MPEG-2 is changed to a predicted frame in H.264 and the MPEG-2 I-frame contains the intra-frame concealment motion vectors.

MPEG-2 fcodes may also be transferred from the decoder module to the encoder module. The MPEG-2 fcodes generally help (i) determine a size of the motion vector refine achieved by the H.264 coding and (ii) determine a direct mode selection (e.g., spatial or temporal). If the fcodes are large (e.g., large motion), the H.264 coding operation may use a spatial direct selection. Otherwise, the H.264 coding operation may use a temporal direct selection.

Transcoding H.264 to MPEG-2.

The video transcoder may be configured to transcode from the H.264 standard to the MPEG-2 standard. Problems for H.264 to MPEG-2 transcoding generally include use of multiple and flexibly assigned reference frames in H.264 compared with a single reference frame in MPEG-2 that may be very constrained. Furthermore, the H.264 standard provides more partitions (e.g., 16×16, 16×8, 8×16, 8×8, 8×4, 4×8 and 4×4) than available in MPEG-2 (e.g., 16×16, and 16×8 field mode).

Several capabilities may be implemented in the video transcoder to resolve one or more of the above problems. For example, only one indicator generally exists in H.264 for both macroblocks in a MB pair (in an MBAFF frame) about how to code the two vertically adjacent macroblocks. To transcode, whatever the macroblock-pair mode is in the H.264 stream (e.g., field or frame) may become the motion compensation mode of the transcoded MPEG-2 stream for the two macroblocks corresponding to the MBAFF pair. Furthermore, the scan order of the MPEG-2 macroblocks may be seeded to the same in H.264. The scan order of the MPEG-2 macroblocks may optionally be refined using further analysis to potentially switch modes if justified. The analysis may include comparing a residual vertical field and frame activities, using results from a frame and field H.264 intra estimator, checking frame and field macroblock or block variances, analyzing frame and field macroblock or block high frequency indicators, examining frame and field macroblock or block motion indicators and the like.

A similar situation to the above generally exists for field-coded pictures in H.264. If the pictures are to be transcoded to MPEG-2 frame pictures, then the macroblock modes may be set to field, with a default field scan and an optional refinement of the scan. In another embodiment, the H.264 field pictures may be transcoded to MPEG-2 field pictures. Furthermore, an MPEG-2 discrete cosine transform (DCT) scan type decision for a field frame decision may be used for encoding, for intra macroblocks when motion vectors are not available.

If multi-reference frames are used in H.264, then the H.264 motion vectors may be rescaled by the decoder module so that the new seed motion vectors for the MPEG-2 stream may be given by equation 1 as follows:

Seed_$MV$=Original_$MV$*(new_currentpic_$TR$−new_referencepic_$TR$)/(old_currentpic_$TR$−old_referencepic_$TR$), where TR generally indicates a temporal position of a picture      Eq. (1)

If a picture adaptive field/frame (AFF) mode is used in an H.264 stream, the resulting MPEG-2 stream may be transcoded to a frame sequence, rather than a field sequence. The MB field/frame motion compensation mode and the field/frame scan order modes may be determined as before. Selection of the frame sequence or field sequence in the MPEG-2 stream may be performed on a frame-by-frame basis.

Figure 4:
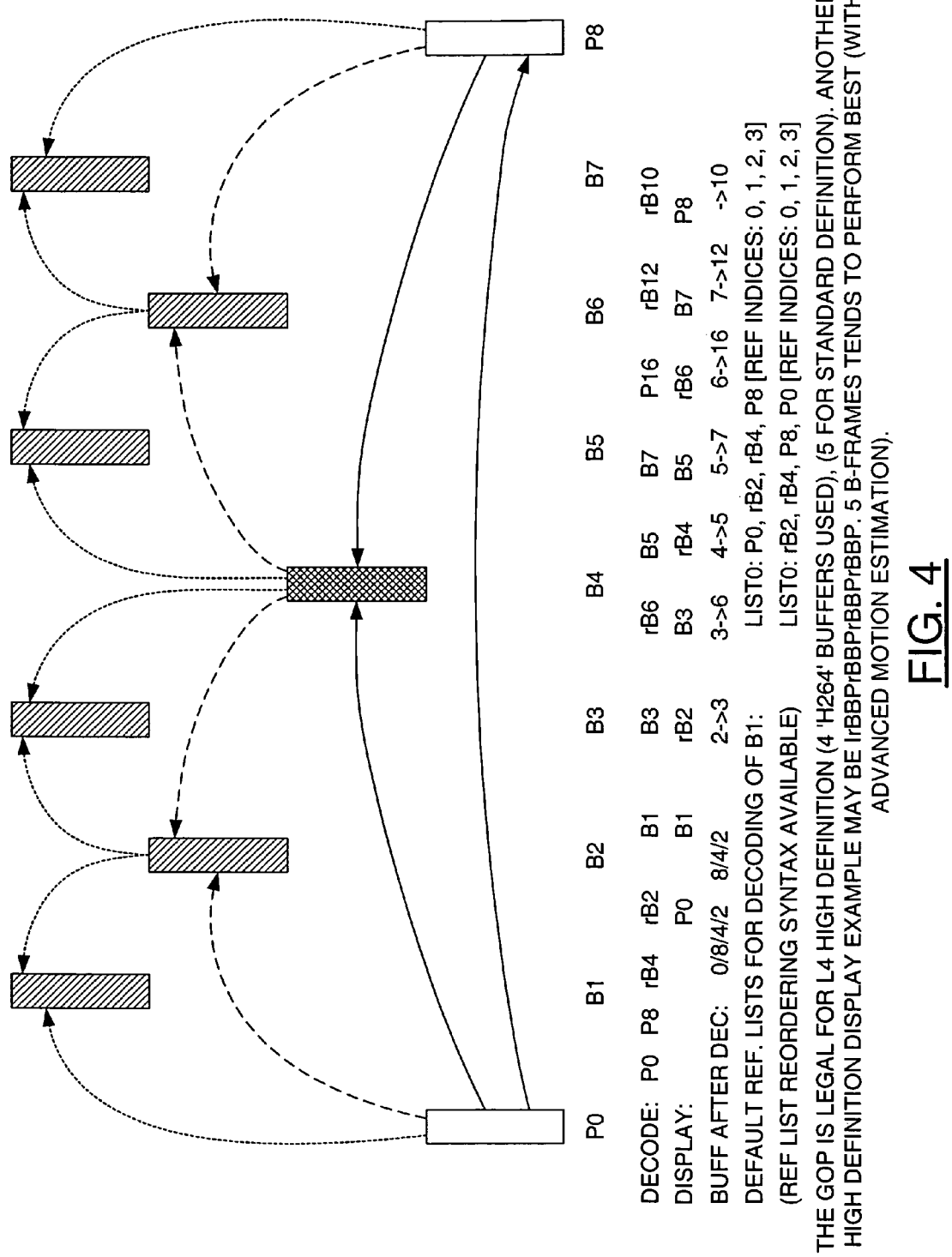
FIG. 4 is a diagram of an example hierarchical group of pictures for an H.264 stream.

Referring to FIG. 4, a diagram of an example hierarchical (or pyramidal) group of pictures for an H.264 stream is shown. Memory management control operation commands may be used to control what frames remains in the reference buffer. A picture order count (generally intended as a display order in practice) may be used for ordering the B reference lists. A frame number is generally used for ordering the P reference lists (the frame number may be intended to distinguish reference frames). H.264 only has completely arbitrary scaling of both reference frames on a macroblock basis (e.g., lighting effects).

If a hierarchical GOP is used for the H.264 stream, the following rules may be followed for a high quality transcoding (i) generate an MPEG-2 I-frame wherever an H.264 I-frame is found and (ii) place the MPEG-2 reference frames such that as many of the original frames were reference frames as possible. A preference generally exists for using the reference frames that were highest in the original hierarchy since the highest reference frames generally have been coded at a highest quality. The most desirable pictures to use as reference frames are generally reference I-frames. The next most desirable reference pictures may be reference frames that contain I-frames as predictors and are nearest to the I-frames. Third most desirable reference pictures may be reference frames that contain as a reference the previously mentioned pictures and are nearest to the previously mentioned pictures, and so on. Therefore, all frames may be ordered by desirability to become reference frames. The MPEG-2 GOP may then be adjusted to maximize a score for using a least number of "undesirable" frames as reference frames in the transcoded video.

If the H.264 macroblock partition is 16×16, the transcode operation may map to MPEG-2 16×16 or 16×8 (for field macroblocks) partitions. If the H.264 partition is 16×8, the transcode operation may test the 16×8 field partition regardless of a field/frame decision. Smaller H.264 partitions may be combined to form a smallest common MPEG-2 partition.

Where small H.264 partitions have been combined to match a size of an MPEG-2 partition, the multiple motion vectors of the multiple H.264 partitions may be combined to generate a motion vector for the larger MPEG-2 partition. Combining H.264 motion vectors may involve an average, a median or a mode (e.g., occupying the most area) of the H.264 motion vectors. The median combining may be either (i) a vector median or (ii) a component median (e.g., x and y direction components may be separate from each other). Furthermore, the average/median/mode may be weighted by a size of the partitions. Once the encoder module has received the motion vectors from the decoder module, the H.264 motion vectors may be refined from the MPEG-2 motion vectors.

For a 3-point vector median calculation, an output vector may be a vector that is opposite (not an end point of) a longest vector joining any two input vectors. For example, starting with three input vectors: A, B and C, determination of the (output) vector median may be given as follows:
1) Find
$M=\max(|A-B|, |A-C|, |B-C|)$, where $|x-y|$ may indicate a Euclidean distance. (Other distance metrics may be used, for example, L1-norm vs. L2-norm may be used.)
2) If $M=|A-B|$
  Output=C
  Else If $M=|A-C|$
  Output=B
  Else // $M=|B-C|$
  Output=A
Where M matches a single difference metric (e.g., $M=|A-B|$), the median may be set to the remaining input vector (e.g., Output=C). Where M matches two or more difference metrics (e.g., $M=|A-B|=|A-C|$), the median may be set based on a priority (e.g., C is higher priority than B and B is higher priority than A). The above median technique may be used in other transcoding format combinations.

Transcoding MPEG-2 to VC-1

Several problems generally exist in transcoding from the MPEG-2 standard to the VC-1 standard. An example problem may involve consistently using either field coding or frame coding within an independently decodable sequence of pictures (e.g., MPEG-2 GOP) and switching on a picture basis between field coding, progressive frame coding and interlaced frame coding.

To overcome the above problem, the video transcoder may reuse one or both of (i) the MPEG-2 quantization parameter (QP) and (ii) bits used per macroblock for a macroblock complexity indicator in a VC-1 encoder rate control. In another example, the MPEG-2 motion vectors may be used to place a VC-1 search center of a motion estimation to refine the MPEG-2 vectors to obtain a refined motion vector for VC-1 encoding for modes generally not supported by MPEG-2. The unsupported MPEG-2 features generally include, but are not limited to (i) different block sizes, (ii) sub-pel accuracy (e.g., from ½ pel to ¼ pel) and (iii) searches with intensity compensated reference pictures.

The MPEG-2 intra-frame concealment motion vectors may be used as a starting point for a VC-1 motion vector refinement. The intra-frame concealment motion vectors may be used if an I-frame from MPEG-2 is changed to a predicted frame in VC-1 and that frame contained concealment motion vectors. Furthermore, MPEG-2 fcodes may be used to help determine a size of the VC-1 motion vector refine. Still further, magnitudes of the DC and low-order AC coded coefficients from MPEG-2 may be used to select the transform block size for VC-1.

Transcoding from MPEG-2 to VC-1 may involve mapping the MPEG-2 partitions into the VC-1 partitions. The mapping into VC-1 may be similar to the mapping of the MPEG-2 partitions into the H.264 partitions. In particular, the MPEG-2 16×16 and 16×8 field partitions may be mapped into VC-1 16×16 and 16×8 partitions, respectively.

Transcoding VC-1 to MPEG-2

Transcoding from the VC-1 standard to the MPEG-2 standard creates multiple issues involving capabilities in VC-1 not found in MPEG-2. For example, VC-1 has multiple ways to partition a macroblock for motion compensation (e.g., 16×16, 16×8 field, 8×8 and 8×8 field). In contrast, MPEG-2 generally has only two choices (e.g., 16×16 or 16×8 field). Furthermore, VC-1 generally uses an intensity compensation while MPEG-2 does not offer such a coding option. The VC-1 format generally uses range reduction whereas MPEG-2 does not. Still further, VC-1 may use a bitplane coding to efficiently encode Boolean macroblock-level flags for an entire picture within the picture header. MPEG-2 may only allow coding of such flags within the macroblock layer. Furthermore, the VC-1 format may use multiple transform block sizes (e.g., 8×8, 8×4, 4×8, 4×4). In contrast, MPEG-2 may only perform an 8×8 transform.

The video transcoder may be configured to overcome one or more of the above problems. For VC-1 interlaced frame pictures, the motion compensation mode (e.g., field or frame) of each VC-1 macroblock may be reused for MPEG-2. Reuse of data from VC-1 directly to MPEG-2 may also apply to the DCT transform mode. A similar situation to the above generally exists for field-coded pictures in VC-1. If the VC-1 field-coded pictures are to be transcoded to MPEG-2 frame-pictures, then the MPEG-2 macroblock modes may be set to the field mode. In another embodiment, the VC-1 field pictures may be transcoded to MPEG-2 field pictures.

If a motion vector switch (MVSW) option is used in VC-1, a direction of a first motion vector may be used as-is. However, a direction of a second motion vector (e.g., every other motion vector) may be reversed and scaled. The reversed motion vector may be scaled into an opposite reference frame from the first motion vector based on relative temporal distances.

If picture AFF is used in a VC-1 stream, the resulting MPEG-2 stream may be transcoded to a frame sequence, rather than a field sequence. The picture AFF transcoding operation may use the methods discussed above for determining the MB field/frame motion compensation and field/frame scan order modes. Selection of the frame sequence or the field sequence in the MPEG-2 stream may be determined on a frame-by-frame basis.

If the VC-1 macroblock partition is 16×16 or 16×8 for field macroblocks, the VC-1 macroblock partitions may be mapped to the same mode in MPEG-2. If the VC-1 partition is an 8×8 frame partition, then four 8×8 partitions may be combined into a 16×16 partition before transcoding. If the VC-1 partition is 8×8 field, then two 8×8 partitions may be combined into a 16×8 field partition.

Combining the small VC-1 partitions into a larger MPEG-2 partition may result in changes to the VC-1 motion vectors. To convert the VC-1 motion vectors to MPEG-2 motion vectors of the combined partition, the video transcoder may calculate an average motion vector, a median motion vector or a mode motion vector (e.g., occupying the most area) to generate a motion vector for the larger MPEG-2 partition. The median motion vectors may be one of (i) a vector median or (ii) a component (e.g., x and y direction components may be separate from each other) median. Furthermore, the VC-1 motion vectors may be used as starting seed directions for refining the MPEG-2 motion vectors.

Transcoding VC-1 to H.264

The video transcoder may be configured to transcode from the H.264 standard to the VC-1 standard. Problems for H.264 to VC-1 transcoding generally include converting a raster scan order of individual macroblocks to a raster scan order of macroblock pairs and converting a regular GOP structure to a hierarchical GOP structure. In addition, differences in the standards may exist for field/frame macroblock decisions, range reduction/range mapping to encode sample values at a reduced dynamic range and different transform block sizes.

Multiple indicators generally exist in two spatially adjoining original VC-1 macroblocks for which H.264 field/frame mode to use for a macroblock pair. The indicators include a motion compensation mode (e.g., field/frame) for a top-macroblock of the two VC-1 macroblocks, a coefficient scan order (e.g., field/frame) for the top-macroblock, a motion compensation mode (e.g., field/frame) for a bottom-macroblock of the two VC-1 macroblocks and a coefficient scan order of the bottom macroblock.

If either or both of the original two VC-1 macroblocks uses field motion compensation, the transcoded H.264 macroblock pair may use the field mode. Optionally, if either or both of the original two VC-1 macroblocks uses a field coefficient scan and has a significant residual (e.g., contains non-zero coefficients), the transcoded H.264 macroblock-pair may use the field mode.

If the macroblock uses the VC-1 direct mode prediction, the transcoded macroblock may use an H.264 temporal direct mode for the H.264 encoding. Specifically, the temporal direct mode may be used for H.264 slices when doing VC-1 to H.264 transcoding so that the VC-1 temporal direct mode macroblock decision may be used to help decide H.264 direct mode or not, as opposed to using a spatial direct mode for the H.264. Use of the H.264 spatial direct mode may yield predictions that differ more from the VC-1 direct mode predictions.

An H.264 intra-prediction direction may be determined by a VC-1 intra-prediction direction. In particular, the VC-1 8×8 intra-prediction direction selection (e.g., horizontal, vertical, DC) may be used when selecting the H.264 directional predictions. An H.264 High Profile encoding may use 8×8 intra-predictions. An H.264 Main Profile encoding may use 4×4 intra-predictions that may all be the same within an 8×8.

A VC-1 quantization parameter (QP) and bits used per macroblock for macroblock complexity indicator may be reused in an H.264 encoder rate control. Furthermore, one or more VC-1 motion vectors may be used to place one or more respective search centers of a motion estimation to refine the VC-1 vectors. The refinement generally results in refined motion vectors for the H.264 encoding for modes that may not be supported, or only optionally supported, by VC-1. The modes may include, but not limited to, different block sizes, subpel accuracy (e.g., from ½ pel to ¼ pel), use of multiple reference pictures, to search with weighted prediction and the like.

Transcoding H.264 to VC-1

The video transcoder may be configured to transcode from the VC-1 standard to the H.264 standard. A single indicator is generally used in the H.264 standard for both macroblocks within a macroblock pair in an MBAFF frame. The single indicator generally identifies how to code two vertically adjacent macroblocks. As such, whatever macroblock-pair mode (e.g., field or frame) is received in an H.264 stream may be used as the motion compensation mode of the transcoded VC-1 stream for the two VC-1 macroblocks corresponding to the H.264 MBAFF pair. The coefficient scan order (e.g., field or frame) of the VC-1 macroblocks may be seeded to the same scan order of the H.264 MBAFF pair. Optionally, the scan order for VC-1 macroblocks may be refined using further analysis to potentially switch modes if justified (e.g., by comparing residual vertical field and frame activities, or by using results from a frame and field H.264 intra estimator).

A similar situation to the above exists for field-coded pictures in the H.264 format. In transcoding the H.264 field-coded pictures into VC-1 frame-pictures, the macroblock modes may be set to field, with a default of field scan, and an optional refinement of the scan may be performed. Alternatively, the H.264 field pictures may be transcoded into VC-1 field pictures.

VC-1 slices may end only at the right end of a macroblock row, whereas H.264 slices do not have a similar limitation (e.g., an H.264 slice may end mid-row). As such, the present invention generally avoids look-ahead processing and the associated additional delay by finishing the macroblock row in which the H.264 slice ends to form the VC-1 slice.

Transcoding from the H.264 format to the VC-1 format may account for differences in the number of applicable reference frames. If multiple reference frames were used in generating the H.264 frame, the motion vectors associated with the H.264 frame may be rescaled to establish new seed motion vectors for the transcoded VC-1 frame in a single reference frame. Rescaling of each H.264 motion vector may be performed according to equation 2 as follows:

$$\text{Seed\_}MV = \text{Original\_}MV * (\text{new\_currentpic\_}TR - \text{new\_referencepic\_}TR)/(\text{old\_currentpic\_}TR - \text{old\_referencepic\_}TR), \text{ where TR generally indicates the temporal position of a picture.} \quad \text{Eq. (2)}$$

If picture AFF is used in an H.264 stream, the resulting VC-1 stream may be transcoded to a frame sequence, rather than a field sequence. The transcoding may use the method discussed above for determining the macroblock field/frame motion compensation and field/frame scan order modes.

If a hierarchical GOP is used for the H.264 stream (see FIG. 4) and if a high quality transcode is planned, the following rules may be followed: (i) place a VC-1 I-frame wherever an H.264 I-frame is used and (ii) place the VC-1 reference frames such that as many of the original frames were reference frames as possible, with a preference toward using the reference frames that were highest in original hierarchy (since such frames will typically have been coded at highest quality). The most desirable pictures to use as reference frames are generally reference I-frames. The next most desirable pictures to use as reference frames may be reference pictures that contain I-frames as predictors and are nearest to the predictor I-frames. Third most desirable pictures may be reference pictures that contain as references the previously mentioned pictures and are nearest to the previously mentioned pictures, and so on. As such, all frames may be ordered by desirability to become reference frames. The VC-1 GOP may then be adjusted to maximize a score for using the least number of "undesirable" frames as reference frames in the transcoded video.

If the H.264 macroblock partition is 16×16, the transcoding may map the H.264 macroblocks into a VC-1 16×16 partition or a 16×8 partition (for field macroblocks). If the H.264 partition is 16×8, a test may be conducted for transcoding to a VC-1 field 8×8 partition regardless of another field/frame decision. Smaller H.264 partitions may be combined to match a smallest common VC-1 partition.

Where two or more H.264 partitions are combined to form a single VC-1 partition, the H.264 motion vectors may also be combined to form the VC-1 motion vector. The combinations may calculate average, median or mode (occupying the most area) motion vectors from smaller H.264 partitions to get the VC-1 larger partition motion vectors. The median may be a vector median or component (e.g., an x-component separate from a y-component) median. Furthermore, the average/median/mode calculations may be weighted by a size of the partitions. The combined motion vectors may be use as calculated or use as seed positions for determining refined motion vectors. Still further, magnitudes of the DC and low-order AC coded coefficients from H.264 may be used to select the transform mode for VC-1.

Figure 5:
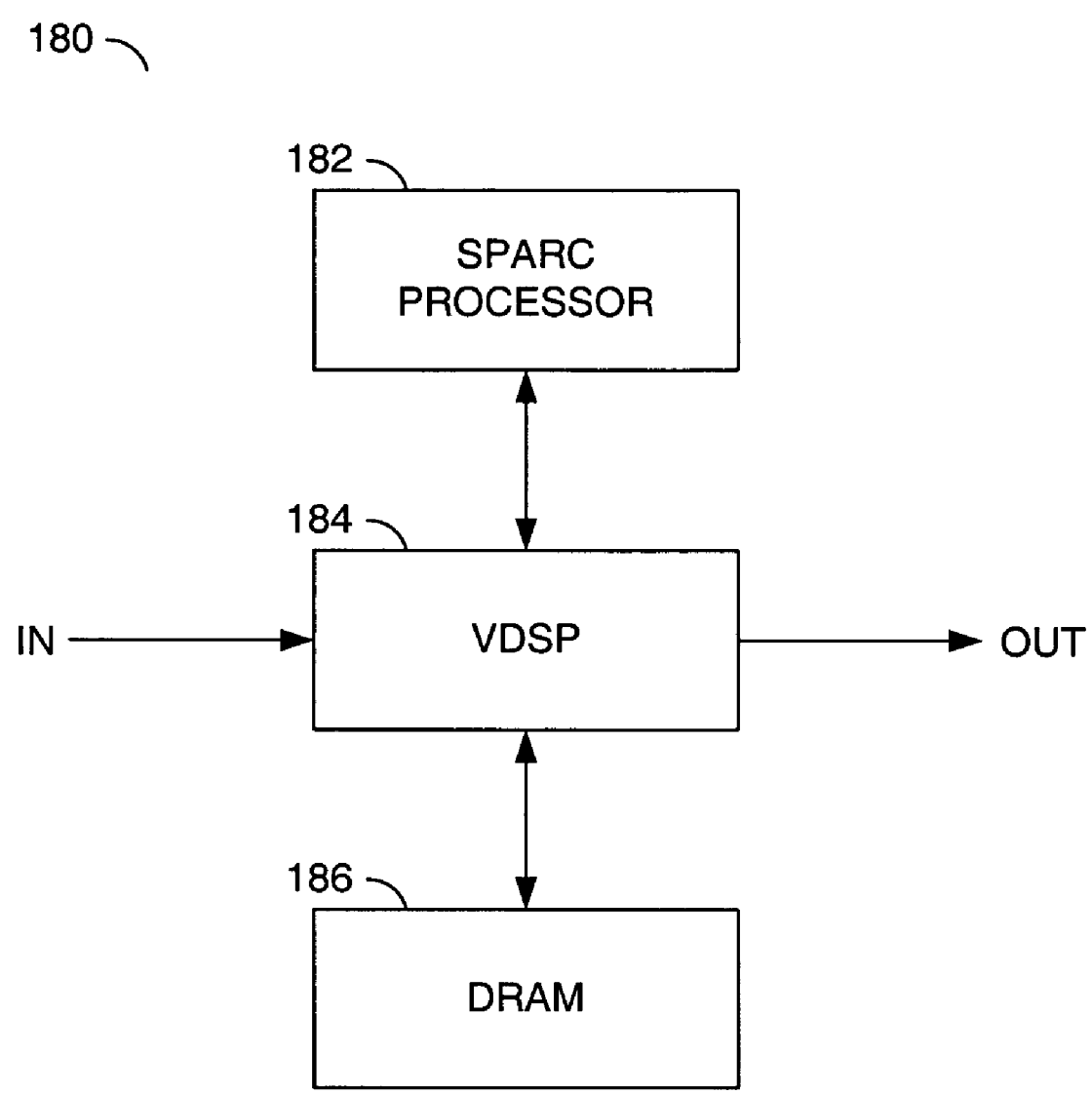
FIG. 5 is a block diagram of an example implementation of a third system.

Referring to FIG. 5, a block diagram of an example implementation of a third system 180 is shown. The system (or circuit) 180 may be referred to as a video transcoder. The video transcoder 180 may implement the video transcoder 100 or the video transcoder 120. The video transcoder 180 generally comprises a processor module (or circuit) 182, a processor module (or circuit) 184 and a memory module (or circuit) 186. The processor module 184 may be directly coupled to the processor module 182 and the memory module 186. The signal IN may be received by the processor module 184. The signal OUT may be presented by the processor module 184.

The processor module 182 may be implemented as a SPARC processor. The SPARC processor 182 may be operational to perform portions of the decoding operations and the encoding operations in software. The SPARC processor 182 may also be operational to control the processor module 184. Other types of processors may be implemented to meet the criteria of a particular application.

The processor module 184 may be implemented as a video digital signal processor (VDSP). The VDSP module 184 may be operational to perform portions of the decoding operations and portions of the encoding operations in hardware. The VDSP module 184 may be controlled by the SPARC processor 182.

The memory module 186 may be implemented as a dynamic random access memory (DRAM). The DRAM 186 may be operational to store or buffer large amounts of information consumed and generated by the decoding operations and the encoding operations of the video transcoder 180. The DRAM 186 may be implemented as a double data rate (DDR) memory. Other memory technologies may be implemented to meet the criteria of a particular application.

Figure 6:
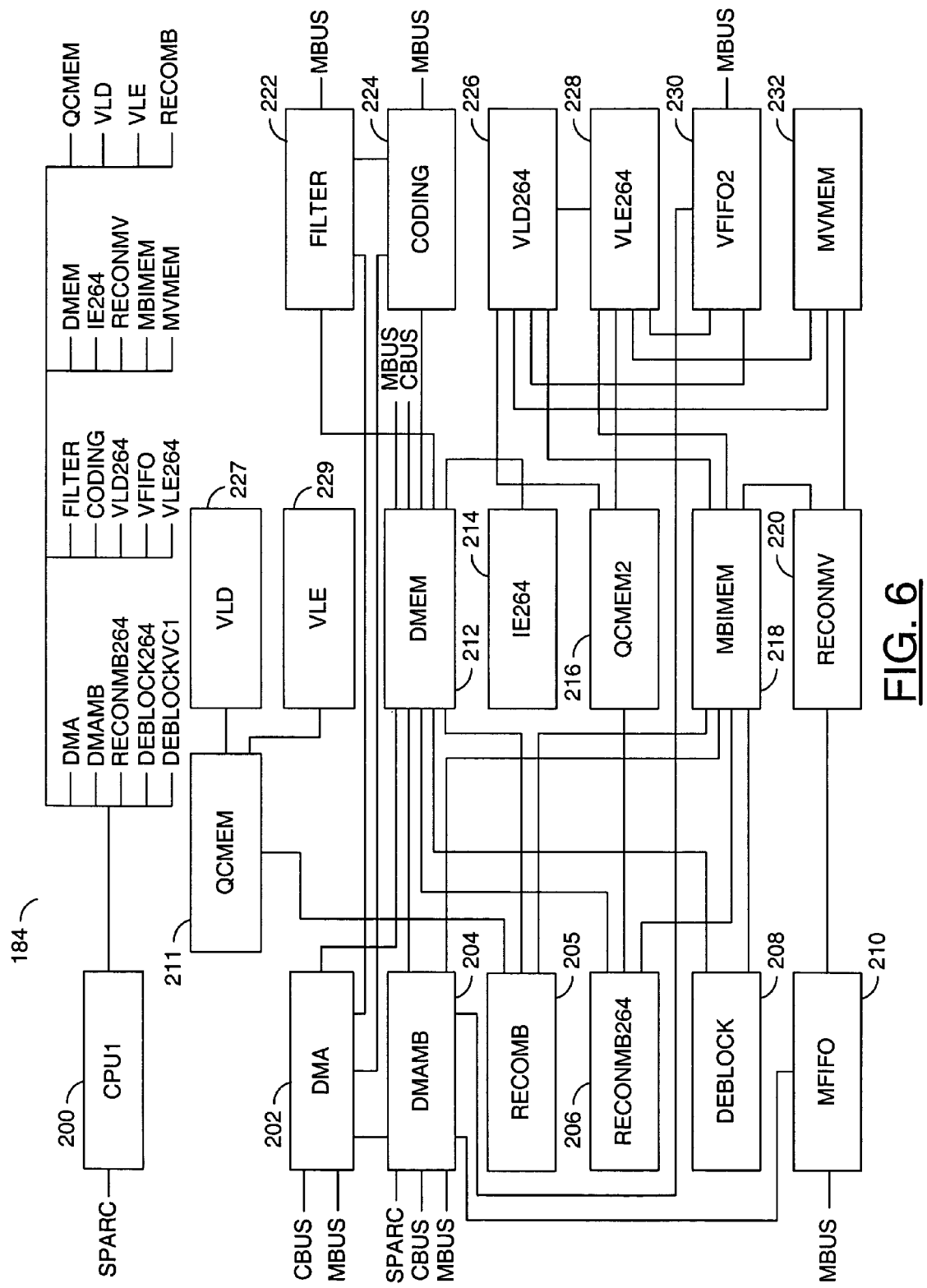
FIG. 6 is a detailed block diagram of an example implementation for a video digital signal processor module.

Referring to FIG. 6, a detailed block diagram of an example implementation for the VDSP module 184 is shown. The VDSP module 184 generally comprises a module (or circuit) 200, a module (or circuit) 202, a module (or circuit) 204, a module (or circuit) 205, a module (or circuit) 206, a module (or circuit) 208, a module (or circuit) 210, a module (or circuit) 211, a module (or circuit) 212, a module (or circuit) 214, a module (or circuit) 216, a module (or circuit) 218, a module (or circuit) 220, a module (or circuit) 222, a module (or circuit) 224, a module (or circuit) 226, a module (or circuit) 227, a module (or circuit) 228, a module (or circuit) 229, a module (or circuit) 230 and a module (or circuit) 232.

The module 200 may be referred to as a central processor unit interface (CPUI) module. The CPUI module 200 may be operational to store commands from the SPARC processor 182 and queue results. The CPUI module 200 may communicate commands from the SPARC processor 182 to the other modules 202-232.

The module 202 may be referred to as a direct memory access (DMA) module. The DMA module 202 may be operational to load and store sub-pel interpolation information to and from the DRAM 186. The DMA module 202 may be a DRAM client.

The module 204 may be referred to as a DMA macroblock (DMAMB) module. The DMAMB module 204 may be operational to support sub-pel interpolation for H.264 operations.

The module 205 may be referred to as a reconstruction macroblock (RECONMB) module. The RECONMB module 205 may be operational to perform macroblock reconstruction for MPEG-2, MPEG-4 and VC-1 streams.

The module 206 may be referred to as another reconstruction macroblock (RECONMB264) module. The RECONMB264 module 206 may be operational to perform forward transforms, inverse transforms, forward quantizations and inverse quantizations for H.264 streams. Furthermore, the RECONMB264 module 206 may be operational to perform forward intra compensation and inverse intra compensation for H.264 streams.

The module 208 may be referred to as a deblocking (DEBLOCK) module. The DEBLOCK module 208 may be operational to deblock reconstructed pictures. Operation of the DEBLOCK module 208 may be slightly different between the H.264 standard and the VC-1 standard.

The module 210 may be referred to as a memory first in first out (MFIFO) module. The MFIFO module may be operational as a general purpose memory FIFO.

The module 211 may be referred to as a quantization coefficient memory (QCMEM) module. The QCMEM module 211 may be operational to store quantization coefficients used by the RECONMB module 205. The QCMEM module 211 may be implemented as a 3-port memory (e.g., r, w, r/w). The QCMEM module 211 may be accessible to the SPARC processor 182.

The module 212 may be referred to as a data memory (DMEM) module. The DMEM module may be operational as a large general purpose data buffer. In one embodiment, the DMEM module 212 may perform the buffering of the memory module 126 (FIG. 2).

The module 214 may be referred to as an intra-frame estimation (IE264) module. The IE264 module 214 may be operational to perform intra-frame estimations for a current macroblock in the H.264 format. The IE264 module 214 may be unused in MPEG-2 operations.

The module 216 may be referred to as another quantization coefficient memory (QCMEM2) module. The QCMEM2 module 216 may store the quantization coefficients for the RECONMB264 module 206. The quantization coefficients may be stored at a multiple bit (e.g., 12-bit) resolution. The QCMEM2 module 216 may be implemented as a 3-port memory (e.g., r, w, r/w). The QCMEM2 module 216 may be accessible to the SPARC processor 182.

The module 218 may be referred to as a macroblock information memory (MBIMEM) module. The MBIMEM module 218 may be operational to store macroblock coding information.

The module 220 may be referred to as a reconstruct motion vector (RECONMV) module. The RECONMV module 220 may be operational to reconstruct compressed motion vectors.

The module 222 may be referred to as a filter module. The filter module may be operational to provide scaling and loop filtering.

The module 224 may be referred to as a coding module. The coding module may be operational to perform entropy coding for a bitstream.

The module 226 may be referred to as a variable length decoding (VLD264) module. The VLD264 module 226 may be operational to perform variable length decoding of the signal IN for H.264 streams.

The module 227 may be referred to as another variable length decoding (VLD) module. The VLD module 227 may be operational to perform variable length decoding of the signal IN for MPEG-2, MPEG-4 and VC-1 streams.

The module 228 may be referred to as a variable length encoder (VLE264) module. The VLE264 module may be operational to perform a variable length encoding to generate the signal OUT as an H.264 stream.

The module 229 may be referred to as another variable length encoder (VLE) module. The VLE module may be operational to perform a variable length encoding to generate the signal OUT as an MPEG-2, MPEG-4 or VC-1 stream.

The module 230 may be referred to as a video FIFO (e.g., VFIFO). The VFIFO module 230 may be operational as a bitstream buffer to buffer hundreds (e.g., 400) of bytes of a bitstream. The VFIFO module 230 may be a DRAM client.

The module 232 may be referred to as a motion vector memory module (e.g., MVMEM). The MVMEM module 232 may be operational to store motion vectors. In particular, the MVMEM module 232 may hold up to 32 motion vectors per macroblock (e.g., from the H.264 standard). The MVMEM module 232 may also be configured to store complex spatial predictions rules for the H.264 standard.

The VDSP module 184 may have several configurations, each implementing a subset of the above modules 200-232. For example, a VDSP module 184 transcoding from MPEG-2 to VC-1 may eliminate the H.264 specific modules, such as the VLD264 module 226, the VLE264 module 228, the RECONMB264 module 206 and the IE264 module 214. In some embodiments, the VDSP module 184 may be implemented with all of the modules 200-232. In such embodiments, one or more of the modules may not be utilized in a particular application.

The VDSP module 184 may be implemented in (on) a single chip (or die). A combination of the SPARC module 182, the VDSP module 184 and the memory module 186 may be configured to perform both the decoder module operations and the encoder module operations substantially simultaneously. Sharing of the DMEM module 212 for (i) results from the decoding and (ii) a source of pixel information for the coding generally allows several coding operations within the VDSP module 184 to be performed simultaneously with the decoding operations, or a slight delay (e.g., less than a decode time for one picture) after the decoding operations.

The present invention may take advantage of separate hardware modules in a chip (e.g., the VDSP chip) to support different standards. The support may be achieved by allowing the different modules to operate in parallel. Hardware modules that support different standards may run in parallel to reduce a number of cycles and a memory bandwidth for a much more efficient transcode compared to existing solutions.

Figure 7:
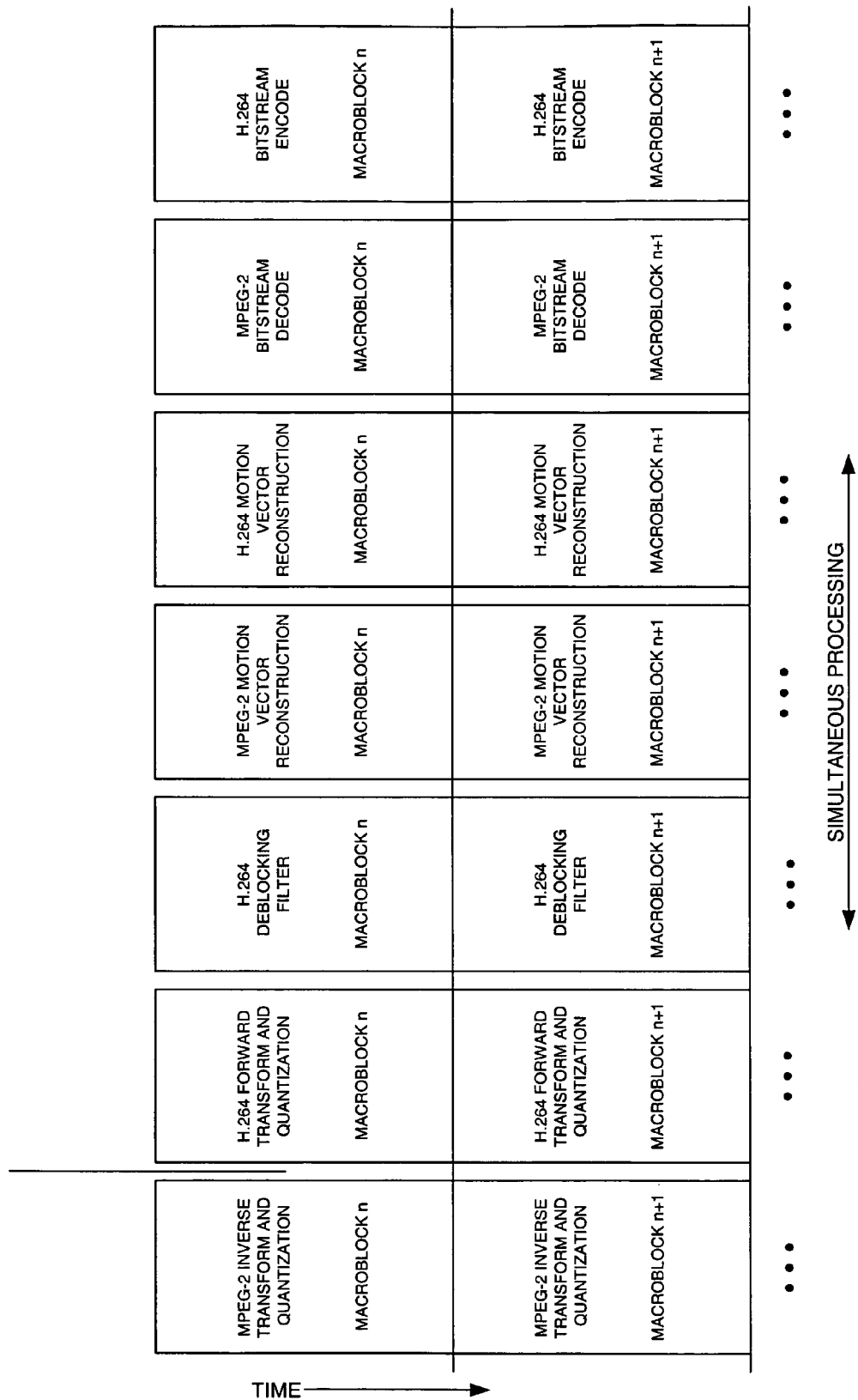
FIG. 7 is a graph of an example time line for different video transcoding operations.

Referring to FIG. 7, a graph of an example time line for different video transcoding operations is shown. The example may illustrate a transcoding between MPEG-2 and H.264. Similar parallel operations may be performed between an MPEG-2 and VC-1. As illustrated, the multiple hardware modules in the VDSP module 184 may operate in parallel. For example, a macroblock reconstruction (e.g., transform/quantization for encoding and inverse transform/inverse quantization for decoding) for an MPEG-2 decode generally happens at the same time as an H.264 encode reconstruction. In another example, a bitstream decoding (e.g., variable length decode, VLD) for MPEG-2 decode may happen at the same time as an H.264 bitstream encode for H.264. In still another example, motion vector reconstruction for MPEG-2 decode generally happens at the same time as motion vector reconstruction for an H.264 encode. Other modules (e.g., motion compensation) may also run in parallel, or in series. For a serial example, if motion compensation may run twice as fast as reconstruction, then MPEG-2 and H.264 motion compensation may happen sequentially relative to each other and in parallel relative to the reconstruction.

A common scratch memory (e.g., DMEM module 212) may be shared between the hardware modules to save both memory space and memory bandwidth. For example, the reconstructed pixels from a decode operation may be used directly as input pixels for an encode operation. In particular, the reconstructed pixels from the decode operation may become the original input to the encode operation without having to reload the pixels to the scratch memory.

A means to synchronize the completion of all parallel hardware units may be implemented. A synchronization instruction may ensure that execution of all parallel units has completed to provide a synchronization point for a control apparatus (e.g., software running on a RISC processor controlling the parallel hardware units).

A feature of the present invention is a system where, given that H.264 and MPEG-2 hardware to support macroblock reconstruction (e.g., transform/quantization, inverse transform/inverse quantization) exists, the multiple reconstruction modules for the different video standards may operate in parallel and a much more efficient transcode may be implemented. For example, for an MPEG-2 to H.264 transcode, while the MPEG-2 IDCT function and IQUANT function are executed, the H.264 forward transform function and forward quantization function may be executed simultaneously.

Another feature of the present invention is a system where, given that H.264 and MPEG-2 hardware to support bitstream encoding and decoding exists, the multiple bitstream encode/ decode hardware may operate in parallel and a much more efficient transcode may be implemented. For example, for an MPEG-2 to H.264 transcode, while the MPEG-2 bitstream decoding (e.g., variable length decode) is being executed, the H.264 bitstream encoding (variable length encode) may be executed simultaneously. Similarly, for the case of content-based adaptive arithmetic code (CABAC) encoding, a content-based adaptive variable length code (CAVLC) to CABAC transcode may also occur in parallel. In one embodiment, the video transcoder may have a combination of some units running in parallel with other units running serially. The present invention may be used to transcode audio bitstreams in a similar manner as transcoding the video streams.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method for transcoding from an H.264 format to a VC-1 format, comprising the steps of:
    (A) decoding an input video stream in said H.264 format to generate a picture having a plurality of macroblock pairs that used an H.264 macroblock adaptive field/frame coding;
    (B) determining a mode indicator for each of said macroblock pairs;
    (C) coding said macroblock pairs into an output video stream in said VC-1 format using one of (i) a VC-1 field motion compensation mode coding and (ii) a VC-1 frame motion compensation mode coding as determined from said mode indicator; and
    (D) finishing decoding a macroblock row, in which an H.264 slice does not end at a right end of said macroblock row, to said right end of said macroblock row to form a VC-1 macroblock slice.

2. The method according to claim 1, wherein said coding of said output video stream uses a VC-1 frame sequence in response to said input video stream using a picture adaptive field/frame coding.

3. The method according to claim 1, further comprising the step of:
    for inter-coded blocks, determining one of (i) a VC-1 8×8 transform, (ii) a VC-1 8×4 transform, (iii) a VC-1 4×8 transform and (iv) a VC-1 4×4 transform from both a first magnitude of an H.264 DC coded coefficient and a second magnitude of an H.264 AC coded coefficient.

4. The method according to claim 1, further comprising the steps of:
    determining a plurality of H.264 motion vectors for said picture; and
    generating a plurality of VC-1 motion vectors by refining said H.264 motion vectors for said picture.

* * * * *